United States Patent
Sundaresan et al.

(10) Patent No.: US 10,425,811 B2
(45) Date of Patent: Sep. 24, 2019

(54) LINKED USER ACCOUNTS FOR AN INTERNET-OF-THINGS PLATFORM

(71) Applicant: Ayla Networks, Inc., Santa Clara, CA (US)

(72) Inventors: Sudha Sundaresan, San Jose, CA (US); Chaitanya Ralladoddi, San Jose, CA (US); Alankritha Sishtla, San Jose, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 220 days.

(21) Appl. No.: 15/243,474

(22) Filed: Aug. 22, 2016

(65) Prior Publication Data

US 2017/0064550 A1    Mar. 2, 2017

Related U.S. Application Data

(60) Provisional application No. 62/209,261, filed on Aug. 24, 2015.

(51) Int. Cl.
| | |
|---|---|
| *H04L 29/06* | (2006.01) |
| *H04L 29/08* | (2006.01) |
| *H04W 12/06* | (2009.01) |
| *H04W 12/08* | (2009.01) |
| *H04W 4/70* | (2018.01) |

(52) U.S. Cl.
CPC ........... *H04W 12/06* (2013.01); *H04L 63/105* (2013.01); *H04L 67/12* (2013.01); *H04W 4/70* (2018.02); *H04W 12/08* (2013.01)

(58) Field of Classification Search
None
See application file for complete search history.

(56) References Cited

U.S. PATENT DOCUMENTS

| | | | | |
|---|---|---|---|---|
| 5,502,555 | A | * | 3/1996 | Lakatos ............ G03G 15/6508 271/9.01 |
| 2008/0134295 | A1 | * | 6/2008 | Bailey .................... G06F 21/41 726/4 |
| 2014/0244833 | A1 | * | 8/2014 | Sharma ................. H04L 67/16 709/224 |
| 2015/0019553 | A1 | | 1/2015 | Shaashua et al. |
| 2015/0113627 | A1 | | 4/2015 | Curtis et al. |
| 2015/0222621 | A1 | * | 8/2015 | Baum .................... H04W 4/70 726/9 |

OTHER PUBLICATIONS

International Search Report and Written Opinion of the International Searching Authority for International application No. PCT/US2016/048192 dated Nov. 3, 2016, 12 pages.

* cited by examiner

*Primary Examiner* — Beemnet W Dada
*Assistant Examiner* — Hassan Saadoun
(74) *Attorney, Agent, or Firm* — Lowenstein Sandler LLP

(57) ABSTRACT

A computing device generates a link between a first user account and a second user account. The computing device logs in in an application or service using the first user account. The computing device receives a request to modify a state of a network-accessible device associated with the second user account. The computing device determines, based on the link, that the application or service has access to the network-accessible device. The computing device then causes the state of the network-accessible device to be modified in accordance with the request.

20 Claims, 8 Drawing Sheets

LINKED USER ACCOUNTS FOR AN INTERNET-OF-THINGS PLATFORM

RELATED APPLICATIONS

The present application claims the benefit of U.S. Provisional Patent Application No. 62/209,261 filed Aug. 24, 2015, which is incorporated by reference herein.

BACKGROUND

Many modern appliances, consumer devices, and other devices include embedded systems that are configured to perform one or more dedicated functions. However, most embedded systems of such devices do not include networking capabilities, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

Moreover, a consumer is likely to purchase network-connected devices that have been manufactured by multiple different original equipment manufacturers (OEMs). Even if each of these OEMs uses the same internet-of-things (IoT) platform to enable the consumer to interface with his network-connected devices over a network (e.g., the Internet), each OEM will typically provide a different user account for the consumer. Thus a consumer may have multiple different user accounts, each associated with a different device or set of devices, which can make accessing and managing the consumer's devices burdensome.

BRIEF DESCRIPTION OF THE DRAWINGS

Reference will now be made to the accompanying drawings showing example implementations of the present application, and in which.

DESCRIPTION OF EXAMPLE IMPLEMENTATIONS

Figure 1A:
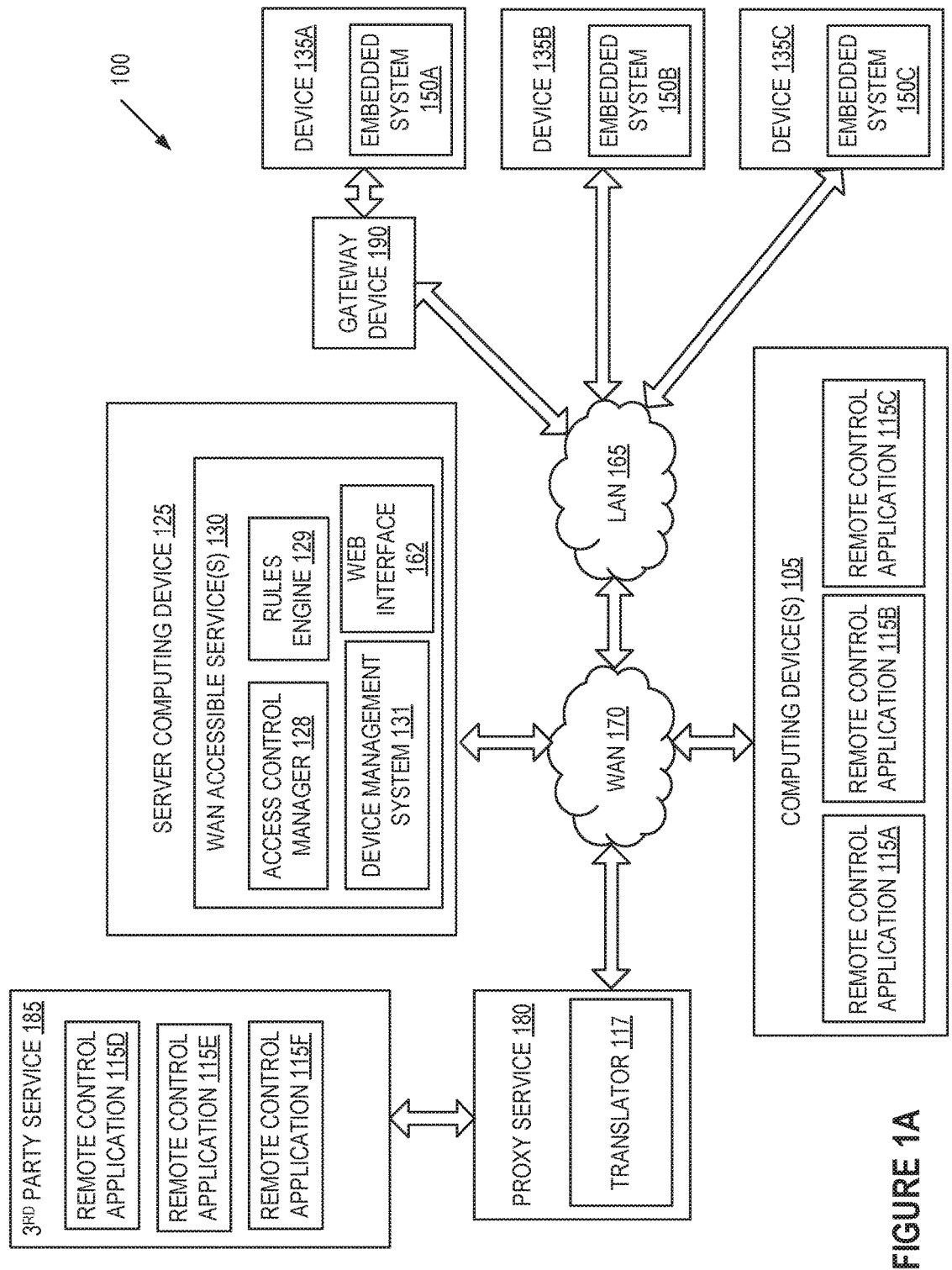
FIG. 1A is a first block diagram depicting an example network architecture.

The Internet of Things (IoT) evolution has enabled consumers and original equipment manufacturers (OEMs) to interact with their connected devices in unprecedented ways. Consumers who buy connected devices expect to be able to control their devices in a secure and convenient manner. This may include controlling their devices from applications on mobile devices, from applications that run within a social network service, from web interfaces, and so on. For OEMs that build connected devices, obtaining data from their devices offers a wealth of information. Typical use cases include analytics, auditing and troubleshooting. Each OEM generally provides one or more user accounts for a user to access and control network-connected devices manufactured by that OEM. As a result, a user may access multiple applications, each of which is for controlling a different device or set of devices of a particular OEM. Additionally, since different devices are associated with different user accounts, communication between devices of different OEMs and application of rules across user devices of different OEMs may be restricted.

Implementations are directed to a network-connected device platform (also referred to as an internet-of-things (IoT) cloud platform or simply an IoT platform) that provides a feature to link disparate user accounts of a user. This may enable more convenient access to, and control of, network-connected devices and other resources while maintaining security for each of the separate user accounts. In one implementation, user accounts are linked as peers. As a result, each of the peer user accounts may gain access to user data associated with any of the other peer user accounts. Moreover, a user may log into any one peer user account and control all of the devices of any of the other peer user accounts while logged into that one peer user account. Additionally, rules may be set up that update devices associated with one user account responsive to a state of a device associated with another user account.

In another implementation, user accounts are arranged hierarchically. A super-user account may be generated and linked to one or more other user accounts. The super-user account may have access to the devices associated with each of the user accounts that are linked to the super-user account. However, user accounts that are linked to the super-user account may not have access to devices or user data associated with other user accounts. The super-user account may share a different subset of user data collected while a user is logged into the super-user account with each of the other user accounts. For example, user data associated with usage of devices manufactured by OEM A may be shared with the user account of OEM A, while user data associated with usage of devices manufactured by OEM B may be shared with the user account of OEM B. Thus, a user may conveniently access each of the user's devices using a single application without loss or leakage of any user data for the individual OEMs.

By allowing users to link their OEM specific user accounts with one another or to a super-user account, the consumer gets the user benefit of one application. At the same time, the OEMs each have the ability to own their user data because the activities of the user from the super-user account can be linked back to the OEM specific user account. This may enable OEMs and retailers (or other providers of super applications) to have various types of data ownership agreements.

Referring now to the figures, FIG. 1A is a block diagram depicting an example network architecture 100 including devices 135A-C remotely accessible embedded systems 150A-C and computing devices that interact with the embedded systems, in accordance with one implementation of the present invention. The network architecture 100 includes multiple devices 135A-C connected to a local area network (LAN) 165A. The devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, light bulbs, electronic locks, signs, electronic billboards, sprinkler systems, and irrigation control systems, as well as medical devices. Devices 135A-C may also be any other type of device that includes an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to a LAN 165 or to a wireless carrier network (e.g., that is implemented using various data processing equipment, communication towers, etc.). The communication module may be configured to manage security, manage sessions, manage access control, manage communications with external devices, and so forth. In one implementation, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 may include a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-C may not support any of the communication types supported by the network device. For example, device 135A may support Zigbee, and device 135B may support Bluetooth. To enable such devices to connect to the LAN 165, the LAN 165 may include a gateway device 190 connected to the network device via one of the connection types supported by the network device (e.g., via Ethernet or Wi-Fi). The gateway device 190 may additionally support other communication protocols such as Zigbee, PLC and/or Bluetooth, and may translate between supported communication protocols. Accordingly, some devices may connect to the LAN 165A through the gateway device 190.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to a server computing device 125. The server computing device 125 may include a physical machine and/or a virtual machine hosted by a physical machine. The physical machine may be a rackmount server, a desktop computer, or other computing device. In one implementation, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts one or more WAN accessible services 130, which may be web based services and/or cloud services (e.g., a web based service hosted in a cloud computing platform). The WAN accessible services 130 may include an access control manager 128, a rules engine 129, a device management system 131 and/or a web interface 162 in some implementations.

Device management system 131 may maintain a session (e.g., via a continuous or intermittent connection) with one or more of the embedded systems 150A-C. Alternatively, the device management system 131 may periodically establish sessions with the embedded systems 150A-C. Via a session with an embedded system 150A-C, device management system 131 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150A-C may identify values or states of some or all detectable parameters of devices 135A-C that the embedded systems are included in. Status updates may also include fault information, statistical device usage information, trace data and/or other information. Such values, states and/or other information may change based on direct user interaction with the devices. Such values, states and/or other information may also change responsive to commands sent to the embedded systems 150A-C by the device management system 131 and/or by one or more computing devices 105. By maintaining or periodically establishing sessions with the embedded systems 150A-C, the device management system 131 may maintain up-to-date information on the states of the devices 135A-C.

Computing devices 105 may include portable devices such as electronic book readers, portable digital assistants, mobile phones, laptop computers, portable media players, tablet computers, cameras, video cameras, netbooks, notebooks, and the like. Computing devices 105 may also include traditionally stationary devices such as desktop computers, gaming consoles, digital video disc (DVD) players, media centers, and the like. Computing devices 105 may connect to the WAN 170 and/or to the LANs 165A-B.

A computing device 105 may include one or more remote control applications 115A-C that can receive information for devices 135A-C and control the devices 135A-C. The remote control applications 115A-C may be configured to interface with and/or control one or more of the devices 135A-C via the devices' embedded systems 150A-C. The remote control applications 115A-C may also be configured to interface with WAN accessible services 130, and to control the devices 135A-C via the WAN accessible services 130. The remote control applications 115A-C may be programmed to run on various operating systems, such as Windows® operating systems, Unix® operating systems, iOS® operating systems, Android® operating systems and Java® operating systems to name a few. The remote control applications 115A-C may also be configured as firmware, or as hardware, or as some combination of software, firmware and/or hardware. The remote control applications 115A-C may include a graphical user interface (GUI) that enables users to interact with and control devices 135A-C in an intuitive and user-friendly manner. A user may interact with the GUI to cause the remote control application to generate notifications, commands, property updates and other messages for the devices represented in the GUI.

In one implementation, a computing device 105 includes separate remote control applications 115A-C for each of the embedded systems 150A-C. Alternatively, computing device 105 may include a remote control application for each OEM that has manufactured the devices 135A-C. For example, computing device 105 may include a first application for Samsung devices, a second application for Whirlpool devices, a third application for GE devices, and so on. Alternatively, or additionally, the computing device 105 may include a remote control application (referred to as a super application) that is capable of communicating with and controlling embedded systems 150A-C for multiple different devices 135A-C manufactured by multiple different manufacturers.

Each of the remote control applications may be associated with a different user account. For example, remote control application 115A may use first credentials to log into a first user account with access control manager 128, remote control application 115B may use second credentials to log into a second user account, and remote control application 115C may use third credentials to log into a third user account. In an example, remote control application 115A may be provided by a first OEM that has manufactured device 135A and device 135B, and may be associated with a first user account, and remote control application 115B may be provided by a second OEM that has manufactured device 135C, and may be associated with a second user account. However, remote control application 135C may be a super application that can be used to log into a third user account that is linked to the first user account and the second user account.

In one implementation, a third party service 185 includes one or more remote control applications 115D-F. The third party service 185 may be, for example, a messaging service and/or a social network service. A user may log into the third party service 185 and gain access to one or more of the remote control applications 115D-F using a user account in third party service.

In one implementation, third party service 185 includes a first remote control application 115D associated with a first OEM, a second remote control application 115E associated with a second OEM and a third remote control application 115F that is a super application. Access control manager 128 may maintain a user account in the IoT platform that mirrors the user account in the third party service 185. The user may issue commands to control a device 135A-C from the remote control application 115D. Third party service 185 may then send the commands to proxy service 180. Proxy service 180 includes a translator 117 that translates the command from the third party service 185 into a format that can be understood and operated on by WAN accessible services 130 (e.g., into an application programming interface (API) call on the WAN accessible services 130). Proxy service 180 then sends the translated command to WAN accessible services 130. WAN accessible services 130 may also send information (e.g., a result of the command and/or status update) back to proxy service 180. Translator 117 may then translate the information into a format understandable to the third party service 185 (e.g., into an API call on the third party service 185), and send the information on to the third party service 185.

While computing devices 105 are connected to WAN 170 or directly to LAN 165, remote control application 115 may establish a session with the WAN accessible services 130 using a particular user account associated with that remote control application. Additionally, a user may use an appropriate third party user account to log into a remote control application 115D-F on third party service 185. The WAN accessible services 130 may provide an interface for indirectly controlling and monitoring one or more of the devices 135A-C associated with that user account. If that user account is linked to other user accounts, then the WAN accessible services 130 may additionally provide an interface for indirectly controlling and monitoring one or more of the devices 135A-C that are associated with those other user accounts. Thus, the user may use a single remote control application and a single user account to control all of the user's devices (which may be associated with various different user accounts).

WAN accessible services 130 include an access control manager 128 that performs authorization and authentication of remote control applications 115 and third party services. Access control manager 128 additionally manages roles and assigns roles to user accounts. Each role provides a set of permissions or privileges with regards to one or more resources (e.g., to one or more devices 135A-C, one or more user resources, etc.). Once a remote control application 115 successfully completes authentication for a particular user account (e.g., by providing proper credentials to the access control manager 128), the access control manager 128 generates a token and provides the token to the remote control application 115. The remote control application 115 may then provide the token to one or more WAN accessible services 130 to gain access to resources such as devices 135A-135C. If the user account that the user has logged into is associated with other user accounts, then the token may be used to gain access to resources (e.g., devices) associated with those other user accounts.

Responsive to receiving a token from a remote control application 115, the WAN accessible service 130 determines a role (or roles) of a user account associated with the remote control application based on the token. Additionally, the WAN accessible service 130 may determine the role (or roles) of any linked user accounts. This indicates to the WAN accessible service 130 what resources the remote control application 115 should have access to. WAN accessible service 130 may then provide information and controls for one or more devices 135A-C and/or access to one or more user resources in accordance with the determined role or roles.

For example, a role associated with a user account may include permissions to control a state of device 135A. If a user desires to change a state of device 135A, the user may issue a command via the remote control application 115, and that command may be sent to the WAN accessible service 130. The WAN accessible service 130 may then forward the command on to the appropriate embedded system for execution.

The role associated with the user account may additionally include permissions to view state information of the device 135A. Accordingly, when the WAN accessible service 130 receives updated state information for device 135A from embedded system 150A, the WAN accessible service 130 may forward the state information on to the remote control application 115A. Thus, based on his assigned role a user may be able to connect to, view status information for, and control the devices 135A-C from anywhere he has access to the Internet. The role of the user account may additionally include permissions to access user resources (e.g., information about particular users or a particular class of users).

As set forth above, users of remote control applications 115A-F may log those remote control applications into a particular user account on WAN accessible services 130 of an IoT platform. Users may additionally log into a user account on the WAN accessible services 130 via a web interface 162 of the WAN accessible services 130 by providing credentials for the user account. The web interface 162 may provide similar functionality as the remote control applications 115A-F, but may be accessed by a user via a web browser running on a user's computing device rather than a remote control application.

WAN accessible services 130 may additionally include a rules engine 129. Rules engine 129 applies one or more rules to determine actions and generate messages and/or commands to implement the determined actions based on received events. The rules engine 129 may at any time receive notifications of events from any of devices 135A-C, third party services 113 or other WAN accessible services 130. The rules engine 112 may then determine whether the data received from a data source satisfies criteria that trigger one or more events or operations indicated in a rule. Responsive to determining that received data satisfies criteria of a rule, rules engine 129 may determine a state change to implement on a device 135A-C, and may issue an instruction to device management system 131 to cause the device management system 131 to send a command to the device 135A-C. On receiving the command, the device 135A-C may execute the command to implement the state change. For example, the state change may include turning on a device or a component of a device, changing a set point of a device, and so on.

Actions, states and measurements on a first device associated with a first user account may cause state changes on a second user device associated with a second user account as a result of a linking between the first user account and the second user account. The linking may be a peer-to-peer link between the first and second user accounts. Alternatively, the first and second user device may both be linked to a third user account that is a super-user account, and the link between the first and second user accounts may be an indirect link via their respective links to the super-user account.

The WAN accessible services 130 may be components of an IoT platform that OEMs can leverage to quickly and easily create new network-connected device products. The IoT platform will handle authorization and authentication, network connection, information gathering and analytics, device management, role based access control and more. The access control manager 128 of the IoT platform provides a framework for setting up and managing roles, user accounts and resources to enable flexibility in managing devices and access to device information.

Figure 1B:
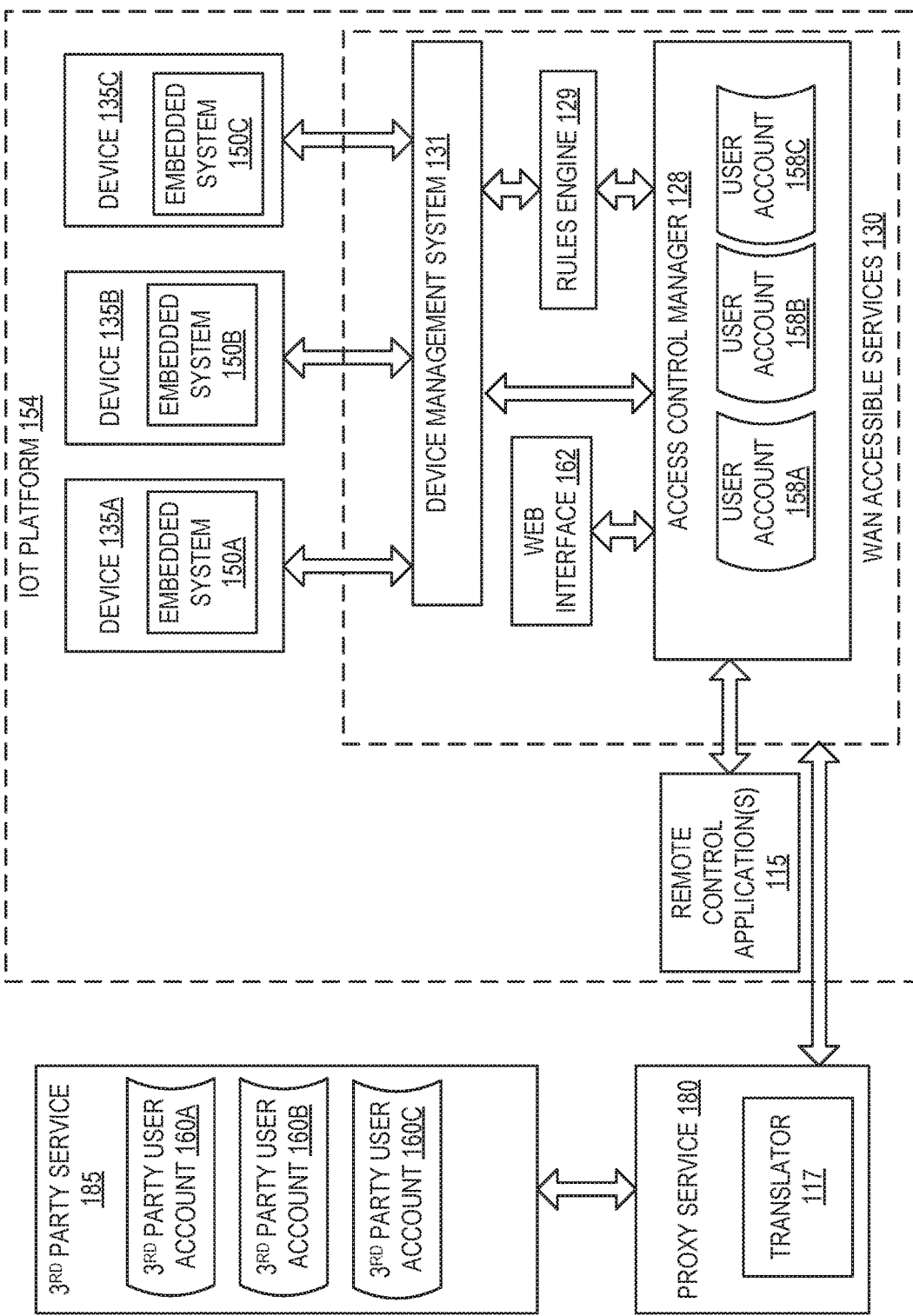
FIG. 1B is a second block diagram depicting the example network architecture.

FIG. 1B is a second block diagram depicting an alternate representation of the example network architecture shown in FIG. 1A. FIG. 1B shows an IoT platform 154 that includes devices 135A-C (each including an embedded system 150A-C), WAN accessible services 130, and remote control applications 115. Also shown is a third party service 185A connected to the WAN accessible services 130 via a proxy service 180 that includes a translator 117. Logical connections are shown between the device management system 131, rules engine 129, web interface 162, and access control manager 128 of the WAN accessible services 130.

As shown, remote control applications 115, third party service 185 and web interface 162 may each connect with access control manager 128 to log into a user account on the IoT platform 154. Once an application or service is logged into a user account, that application or service may gain access to all of the devices associated with that user account as well as the devices associated with other user accounts linked to the user account to which the application or service has logged into.

A user may generate a new user account 158A-C via a remote control application or the web interface 162. To create a new user account 158A-C, the user may select a user ID and provide one or more user credentials such as a password, a pin number, a fingerprint, a voice print, a retina scan, and so on. A user may have multiple user accounts within the IoT platform. For example, a first user account of a user may be for a first OEM, a second user account of the user may be for a second OEM, and a third user account of the user may be a super-user account associated with a retailer.

A user may have multiple different third party user accounts 160A-B on the third party service 185. For example, a user may generate a first third party user account 160A within third party service 185 for accessing devices of a first OEM and may generate a second third party user account 160B within third party service 185 for accessing devices of a second OEM. When a third party user account 160A-C is generated, third party service 185 may send a notice to access control manager 128 via proxy service 180. The access control manager 128 may then generate a corresponding user account 158A-C within the IoT platform 154. Accordingly, for each third party user account 160A-C access control manager 128 may include a counterpart user account 158A-C. The counterpart user account 158A-C may include the same user identifier (ID), password and/or other credentials that a user provided to generate the corresponding third party user account 160A-C in some implementations. Alternatively, the counterpart user account 158A-C uses different user IDs and/or passwords from those of the third party user accounts. In one implementation, the third party service 185 includes the credentials for a third party user account 160A-C in the notice sent to access control manager 128. Accordingly, when a user logs into the third party user account 160A-C in the third party service 185 that user also causes the third party service 185 (or a remote control application running within the third party service 185) to log into the IoT platform using those same credentials.

Figure 2A:
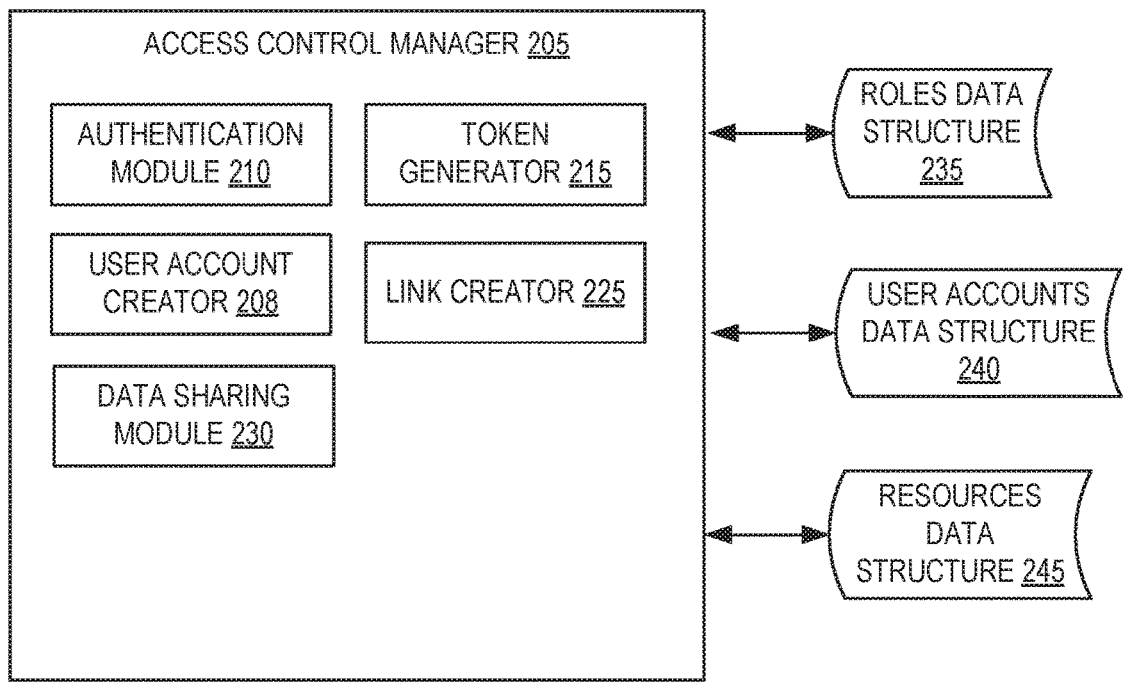
FIG. 2A is a block diagram of an example implementation of an access control manager.

FIG. 2A is a block diagram of an example implementation of an access control manager 205, which in one implementation corresponds to access control manager 128 of FIGS. 1A-B. Access control manager 205 may include an authentication module 210, a user account creator 208, a token generator 215, a link creator 225, and a data sharing module 230. Alternatively, the functionality of one or more of the authentication module 210, user account creator 208, token generator 215, link creator 225 and/or data sharing module 230 may be combined into a single module or divided into multiple sub-modules.

In one implementation, access control manager 205 maintains a roles data structure 325, a user accounts data structure 240 and a resources data structure 245. Each of the data structures 235-245 may be a separate table, spreadsheet, database, or other data structure. Alternatively, the data structures 235-245 may be combined into a single data structure.

Resources data structure 245 includes entries for every resource. Examples of resources include devices, users, firmware images, device templates, and so forth. Device resources may include particular devices and/or components, attributes, settings, parameters, data, etc. of particular devices. User resources may include user account information, user demographic information, user behaviors, user purchase history, user historical data, and so forth. Some resources may have sub-resources, which may be hierarchically arranged. For example, device resources may have sub-resources for settings/parameters, OEM data (e.g., including analytical, trace, statistical and other data that might not be provided to end users), user data, and so on.

Roles data structure 235 contains an entry for each role. Each role may have a unique set of privileges for accessing resources. In one implementation, each role includes one or more tags, each of which may be associated with one or more resources. The tags may have fixed or variable values. In one implementation, in order for a role to have a privilege to access a resource, a value of a tag associated with that role should be equal to a value of a similar tag associated with the resource. Tags may be used, for example, to restrict access to resources by remote control applications running on mobile devices that are on a same LAN as a device.

The user accounts data structure 240 includes an entry for each user account. User accounts may include information such as user preferences/settings, user information, user authorization and authentication data (e.g., name and password, biometric data, etc.), devices owned by users, and roles associated with the users.

User account creator 208 generates new user accounts. New user accounts may be generated responsive to an account generation request from an OEM, from a user who has purchased a device manufactured by an OEM, or from a third party service. User account creator 208 may generate a user account for a specific OEM and/or for a specific third party. Such user accounts generally have access to devices manufactured by that specific OEM or sold by the specific third party, but do not have access to user devices manufactured by other OEMs or sold by other third parties. User account creator 208 may additionally create a super-user account that is not linked to any single OEM or any single third party.

To generate a new user account, user account creator 208 may request and receive a user name or may automatically generate a user name. User account creator 208 may additionally request and receive user credentials that will be used for authentication purposes to log into the user account on the IoT platform.

Notably, each OEM may set up a unique user account with a user for control of devices manufactured by that OEM. Accordingly, a user who purchases devices from multiple different OEMs is likely to have multiple different user accounts. As mentioned above, while maintaining distinct user accounts based on device OEMs enables those OEMs to secure proprietary user data, this can cause an inconvenience to users.

Additionally, some OEMs may provide applications that run within third party services such as social networking services and/or messaging services. One such service is WeChat, developed by Tencent®. Such third party services may enable users to log into a remote control application that runs within the third party service. Additionally, such a third party service may provide a third party authorization service to the OEM, where the user logs into a mobile device application provided by the OEM or a web application provided by the OEM using a user account of the third party service. For example, the third party service may provide OAuth services to the OEM. OAuth provides client applications a secure delegated access to server resources on behalf of a resource owner. It specifies a process for resource owners to authorize third-party access to their server resources without sharing their credentials. OAuth essentially allows access tokens to be issued to third-party clients by an authorization server, with the approval of the resource owner. The client then uses the access token to access the protected resources hosted by the resource server. If the third party service provides OAuth services, it may set up separate user accounts for OAuth from a web application and OAuth from a mobile application. Thus, the user may have a first user account with the third party service that is used to log in to the application running on the third party service, a second user account with the third party service that is used for authenticating the mobile application and a third user account with the third party service that is used for authenticating the web application. User account creator 208 may generate a separate user account within the IoT platform to mirror each of the user accounts set up with the third party service.

Different OEMs may provide their own applications that run within the same third party service and/or may use OAuth provided by that third party service for authentication of applications that run outside of the third party service. As mentioned above, access control manager 205 may generate a distinct user account within the IoT platform for each of the user accounts within the third party service. As a result, a user may have numerous user accounts.

Link creator 225 creates links between user accounts, which can improve a user experience and increase functionality. A link may be created by prompting a user to provide authentication credentials for each of the user accounts that is to be linked. Authentication module 210 may perform the prompting and may verify the credentials. If the credentials are verified, then a link may be created between user accounts.

Links may be one way links, in which a first user account gains access to the user device and/or other resources associated with the second user account but the second user account does not gain access to user devices and/or other resources associated with the first user account. Links may also be two-way links, in which each user account gains access to user devices and/or other resources of the other user account.

In an example, an OEM may have a first remote control application that runs in a third party service. The OEM mal also provide a second web application that user the third party service for third party authentication (e.g., OAuth). The OEM may also provide a third remote control application that runs on a computing device and that also uses the third party service for third party authentication. The third party service may include three third party user accounts for a user, where a first third party user account for the user is for the first remote control application, a second third party user account is for the web application, and the third third party user account is for the third remote control application. User account creator may generate a counterpart first user account that corresponds to the first third party user account, a counterpart second user account that corresponds to the second third party user account, and a counterpart third user account that corresponds to the third third party user account. Link creator 225 may ten create two-way links between the first, second and third user accounts. The user may then log into any of the first remote control application, the second web application or the third remote control application to share access to the same network-accessible devices.

Various data sharing agreements may also be set up between linked accounts. Accordingly, user data collected while a user is logged into one user account may be shared by data sharing module 230 with other user accounts that are linked to that active user account. As a result, an OEM does not lose access to user data that they would collect if a user logged into a user account associate with that OEM when the user instead logs into a linked account.

Data sharing module 230 may send data updates to OEMs continuously or on a periodic basis (e.g., every hour, every minute, every day, etc.). In one embodiment, data updates are sent or made available to OEMs as the data updates become available. In another embodiment, data updates are sent or made available to OEMs when a threshold amount of data is available.

User accounts may be linked as peers using two way links. If user accounts are linked as peers, then it may not matter which user account the user logs into. Data may be shared between the user accounts as though the user had logged into any of the other user accounts.

User accounts may also be linked hierarchically to a super-user account using the one way links. Thus, if a user logs into a super-user application using the super-user account, the user will have access to each of the user accounts that is linked to the super-user account. This enables the user to control all of his devices from a single application.

Figure 2B:
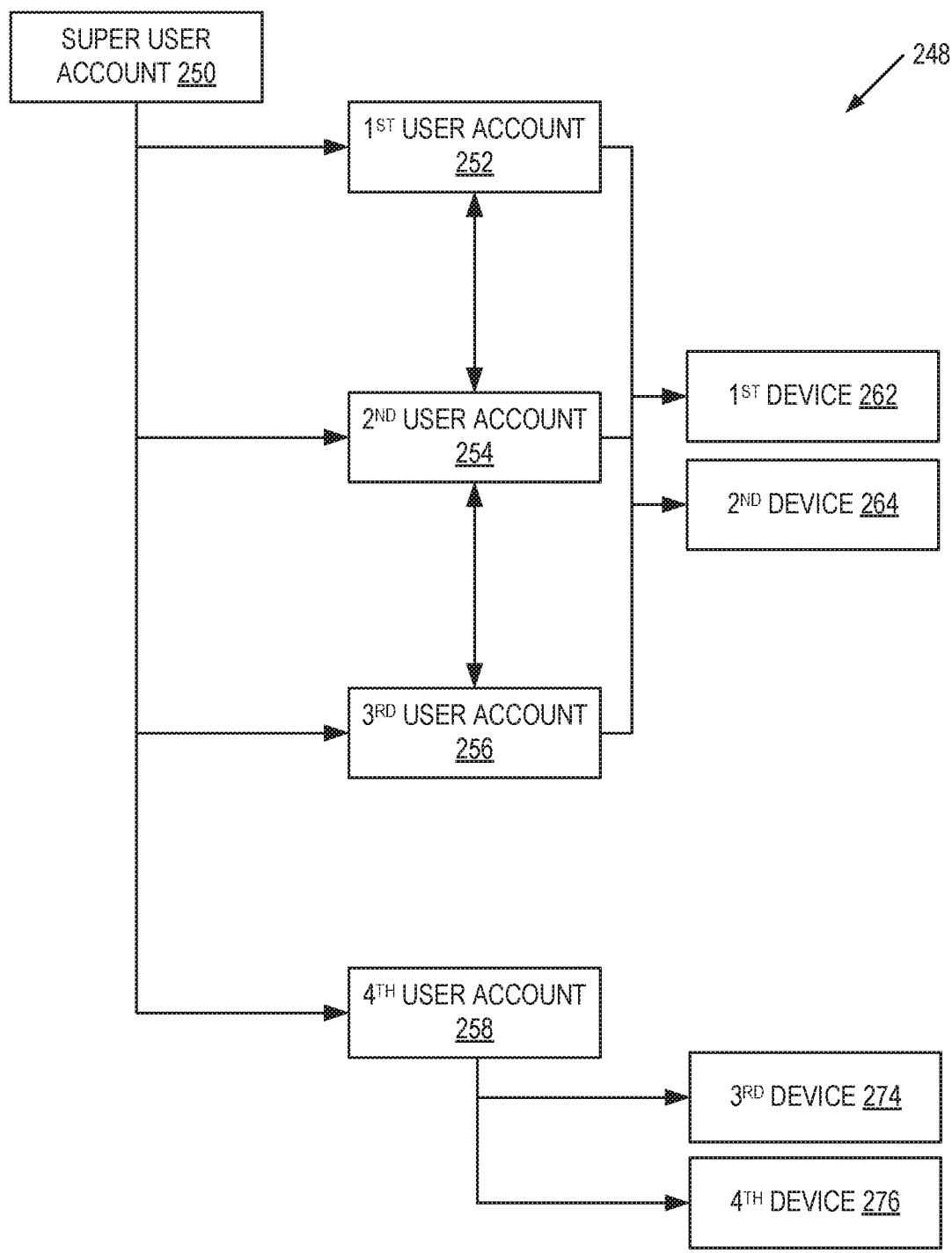
FIG. 2B illustrates an example hierarchy of linked user accounts, in accordance with one implementation.

FIG. 2B illustrates an example hierarchy 248 of linked user accounts, in accordance with one implementation. As shown, a first user account 252, second user account 254, and third user account 256 are each linked together as peers. The first user account 252, second user account 254 and third user account 256 all have access to first device 262 and second device 264. A user may log in to any of these user accounts to control the first device 262 and second device 264.

Additionally, first user account 252, second user account 254, third user account 256 and fourth user account 258 are each linked to a super-user account 250. Fourth user account has access to third device 274 and fourth device 276. Accordingly, a user that logs into super-user account 250 can control all of devices 262-276.

In an example, first user account 252 may be a mirror of a web application OAuth account of a first OEM with a third party messaging service, second user account 254 may be a mirror of a mobile application OAuth account of the first OEM with the third party service, and third user account 256 may be a mirror of an application that runs in the third party service. Fourth user account 256 may be a user account of a user with a second OEM. Super-user account 250 may be a user account with a retailer from which each of the devices 262-276 were purchased.

The first OEM may attach metadata to the first, second and third user accounts 252-256. The second OEM may attach different metadata to the fourth user account 258. Metadata that an OEM may attach to a user account may include context tags associated with a customer relationship management (CRM) system, tags based on various criteria such as location, usage patterns (e.g., frequency of using particular features), user rating tags (e.g., rated as 3 stars, 4 stars, etc.), and so on. There may be distinct metadata associated with the super-user account as well. Such metadata may or may not be shared between user accounts.

Referring back to FIG. 2A, data sharing module 230 shares data between user accounts. The nature and amount of data shared may depend on an agreement between administrators of the different user accounts. For example, OEMs may agree to full or partial data sharing and set up linked peer user accounts. Alternatively, one or more OEMs may set up different agreements with a provider of a super application. As a user performs actions in a particular user account, some or all of the data generated during a session may be shared with other linked user accounts.

Authentication manager 210 manages user accounts. Each user account may include one or more owned devices and/or devices being shared with the user account, one or more registered computing devices allowed to communicate with the devices, and one or more roles associated with the user account.

A user may attempt to log in to a user account by providing credentials (e.g., user name and password) to access control manager 205 from a computing device. Authentication module 210 verifies that the provided credentials match stored credentials for the user account. If the provided credentials match stored credentials for the user account, authentication module 210 invokes token generator 215.

Token generator 215 generates a token for the user and sends the token to the computing device of the user. The token may then be presented to any WAN accessible service of the IoT platform to gain access to resources. Responsive to the computing device presenting the token to a WAN accessible service, the WAN accessible service may use the token to check which role or roles are associated with the user account, and thus determine which resources the user account has access to as well as the type and level of access.

FIGS. 3-6 are flow diagrams showing various methods of generating and using linked user accounts. The methods may be performed by a processing logic that may comprise hardware (e.g., circuitry, dedicated logic, programmable logic, microcode, etc.), software (e.g., instructions run on a processing device to perform hardware simulation), or a combination thereof. In one implementation, at least some operations of the methods are performed by a computing device executing an access control manager 128, such as access control manager 128 of FIGS. 1A-B and/or access control manager 205 of FIG. 2A.

Figure 3:
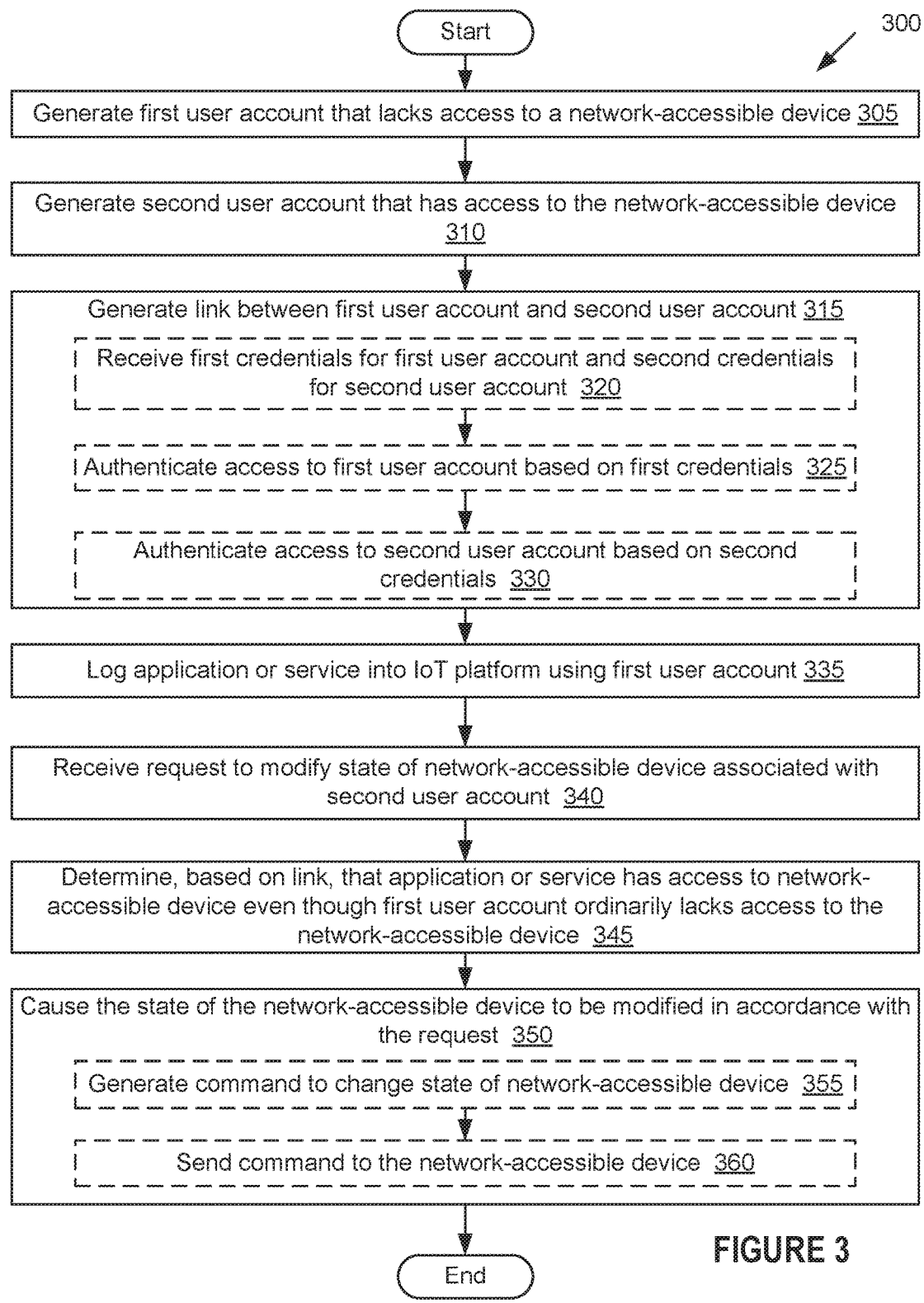
FIG. 3 illustrates one implementation for a method of generating linked user accounts within an IoT platform.

FIG. 3 illustrates one implementation for a method 300 of generating linked user accounts within an IoT platform. At block 305 of method 300 processing logic generates a first user account. The first user account may have access to one or more network-accessible devices of a first OEM associated with the user account, but may lack access to one or more additional network-accessible devices of a second OEM. Alternatively, the first user account may not have access to any network-accessible devices. At block 310, processing logic generates a second user account. The second user account may have access to the one or more additional network-accessible devices of the second OEM, but may lack access to one or more network-accessible devices of the first OEM.

At block 315, processing logic generates a link between the first user account and the second user account. The link may be a one-way link in which the second user account grants to the first user account access to the one or more additional network-accessible devices of the second OEM but does not gain access to devices associated with the first user account. Alternatively, the link may be a two-way link in which each user account grants device access of devices to the other user account. If a two-way link is established, then the first user account and the second user account may be set up as peer user accounts.

In one implementation, generating the link between the first user account and the second user account includes receiving a request to link accounts. A user may then select the accounts to be linked and may select the link type to use to connect the user accounts. At block 320, processing logic may receive first credentials for the first user account and second credentials for the second user account. At block 325, processing logic authenticates access to the first user account based on the first credentials. At block 330, processing logic authenticates access to the second user account based on the second credentials. Once the credentials are verified for the first and second user accounts, those user accounts are linked.

At block 335, processing logic logs an application or service into the IoT platform using the first user account. This may include receiving a request from the application or service to log into the first account. The request may include the user ID and credentials for the first user account. Responsive to verifying the credentials, processing logic logs the application or service into the first user account. This may include generating a token and sending the token to the application or service.

A block 340, processing logic receives a request to modify a state of a network-accessible device associated with the second user account. At block 345, processing logic determines that the first user account does not ordinarily have access to the network-accessible device. However, processing logic additionally determines that the second user account has access to the network-accessible device, and that the link between the first user account and the second user account grants the first user account access to the network-accessible device.

At block 350, processing logic causes the state of the network accessible device to be modified in accordance with the request. This may include at bock 355 generating a command to change the state of the network-accessible device and at block 360 sending the command to the network-accessible device.

Figure 4:
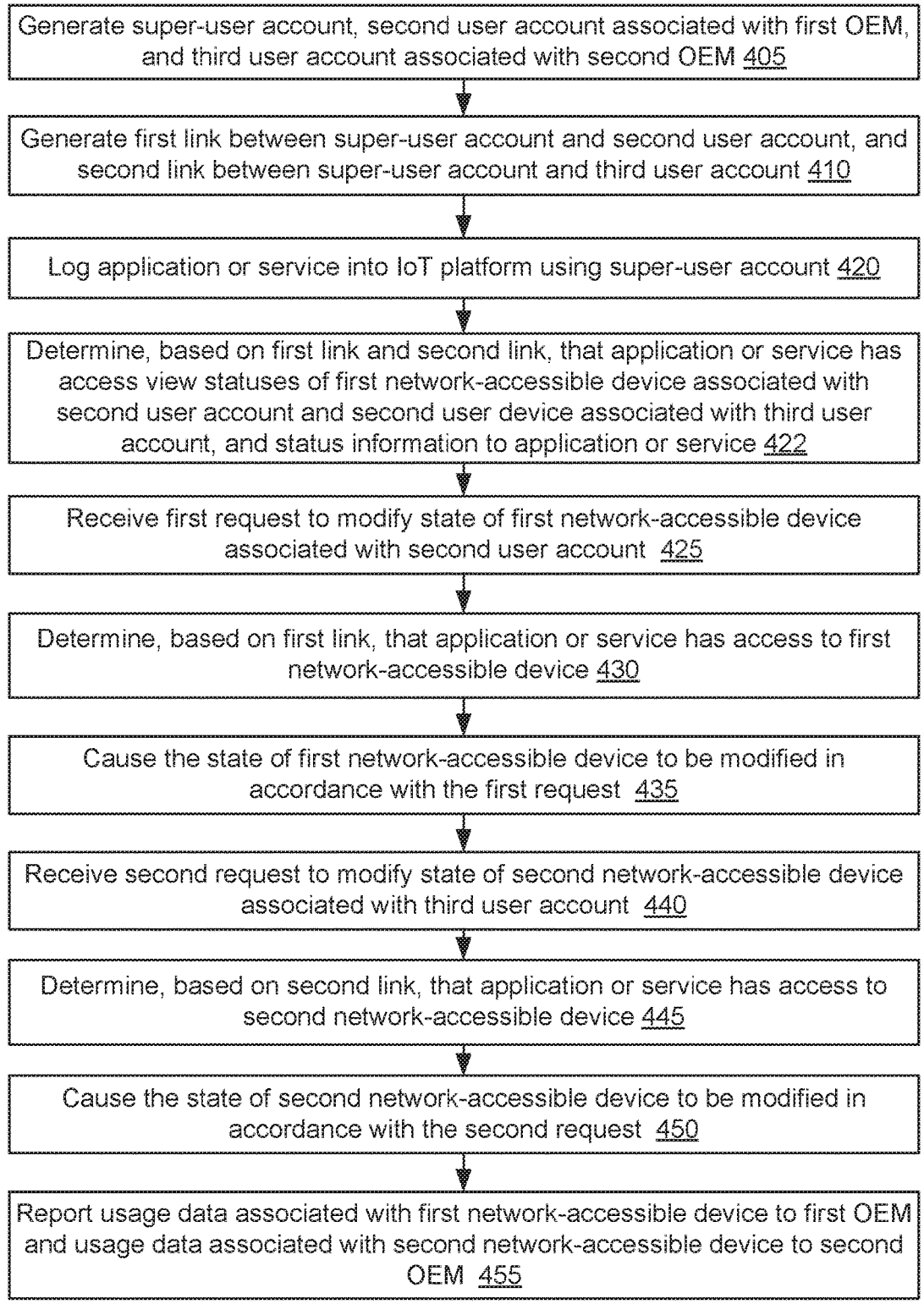
FIG. 4 illustrates one implementation for a method of generating a super-user account linked to other user accounts within an IoT platform.

FIG. 4 illustrates one implementation for a method 400 of generating a super-user account linked to other user accounts within an IoT platform. At block 405 of method 400, processing logic generates a super-user account, a second user account associated with a first OEM and a third user account associated with a second OEM. At block 410, processing logic generates a first link between the super-user account and the second user account and a second link between the super-user account and the third user account.

At block 420, processing logic logs an application or service into the IoT platform using the super-user account (e.g., logs the application or service into the super-user account on the IoT platform). The application may be a web application, a remote control application running on a computing device, an application running within a third party service, or another application. The service may be, for example, a third party service.

At block 422, processing logic determines from the first link that the super-user account (and thus the application or service logged into the super-user account) has access to view the status of a first network-accessible device associated with the second user account. Additionally, processing logic determines from the second link that the super-user account (and thus the application or service logged into the super-user account) has access to view the status of a second network-accessible device associated with the third user account. Processing logic then provides status information for the first network-accessible device and the second network-accessible device to the application or service.

At block 425, processing logic receives a first request to modify a state of the first network-accessible device associated with the second user account. At block 430, processing logic determines, based on the first link, that the application or service has access to the first network-accessible device because the second user account has access to the first network-accessible device. At block 435, processing logic causes the state of the first network-accessible device to be modified in accordance with the first request.

At block 440, processing logic receives a second request to modify a state of the second network-accessible device associated with the third user account. At block 445, processing logic determines, based on the second link, that the application or service has access to the second network-accessible device because the third user account has access to the second network-accessible device. At block 450, processing logic causes the state of the second network-accessible device to be modified in accordance with the second request.

At block 455, processing logic reports usage data associated with the first network-accessible device to the first OEM. Processing logic additionally reports usage data associated with the second network-accessible device to the second OEM.

Figure 5:
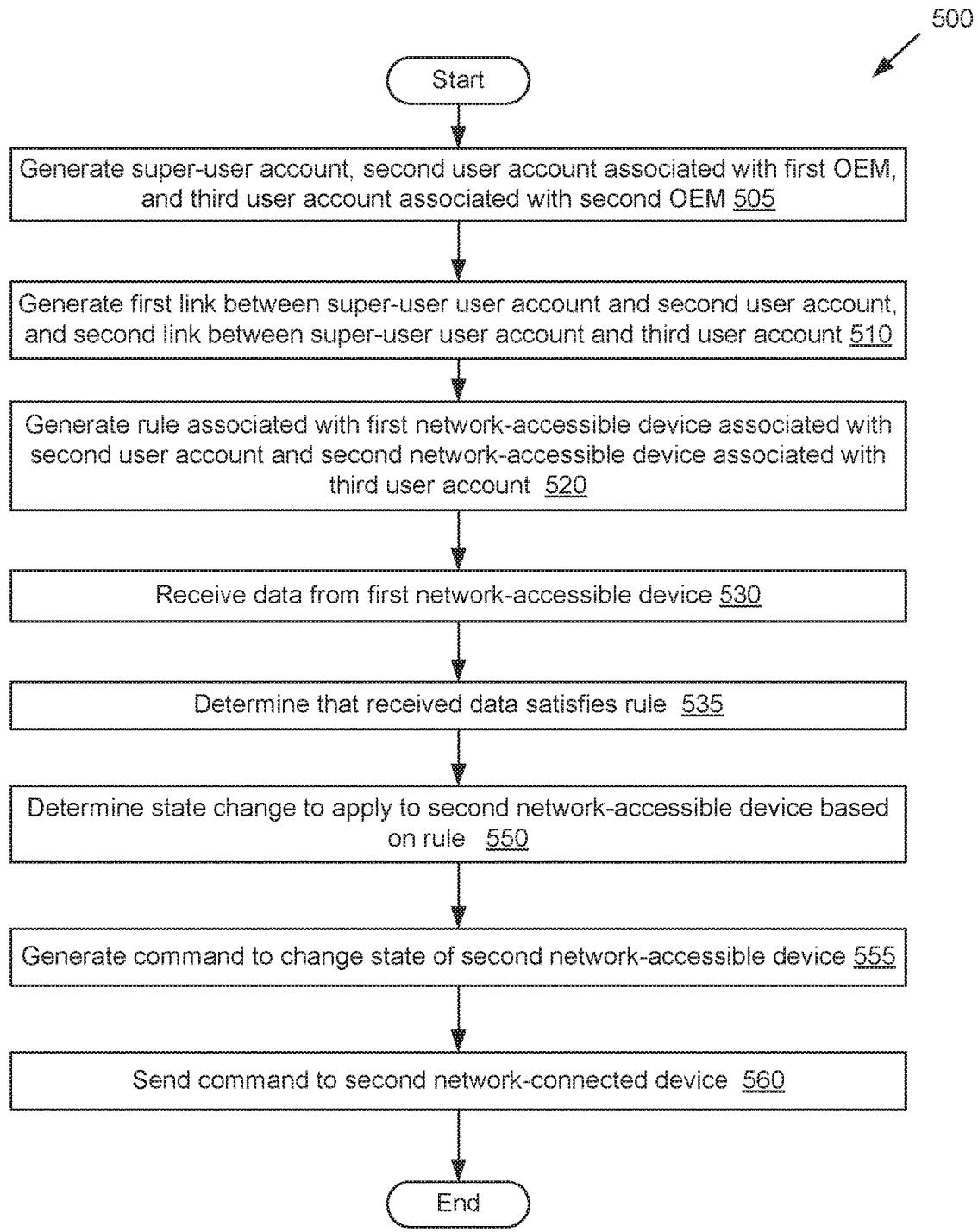
FIG. 5 illustrates one implementation for a method of using linked user accounts to enable a device associated with one user account to change a state responsive to a state of another device associated with another user account.

FIG. 5 illustrates one implementation for a method 500 of using linked user accounts to enable a device associated with one user account to change a state based on a state of another device associated with another user account. At block 505 of method 500, processing logic generates a super-user account, a second user account associated with a first OEM and a third user account associated with a second OEM. At block 510, processing logic generates a first link between the super-user account and the second user account and a second link between the super-user account and the third user account.

At block 520, processing logic generates a rule associated with a first network-accessible device associated with the second user account and a second network-accessible device associated with the third user account. Since the first and second network-accessible devices are associated with different user accounts, they might ordinarily not be able to affect one another. However, because the second and third user accounts are each linked to the super-user account, rules can be generated from a single account to enable the first network-accessible device to affect a state of the second network-accessible device, and vice versa. Similarly, if the second user account and third user account were linked directly as peer user accounts, rules could also be set up that enable these network-accessible devices to affect one another.

At block 530, processing logic receives data from the first network-accessible device. The data may be a command sent from the first network-accessible device, a status change of the first network-accessible device, a sensor measurement of the first network-accessible device, and/or other data. At block 535, processing logic determines that the received data satisfies the rule.

At block 550, processing logic determines a state change to apply to the second network-accessible device based on the rule. Alternatively, or additionally, processing logic may determine data to send to the second network-accessible device based on the rule. At block 555, processing logic generates a command to change the state of the second network-accessible device. At bock 560, processing logic sends the command to the second network-connected device. The second network-connected device may then execute the command to achieve the state change.

In an example, the first network-accessible device may be an electronic door lock manufactured by the first OEM that is attached to an external door of a house, the second network-accessible device may be a light, manufactured by a second OEM, that is located in a room of the house, and a rule may state that the light is to turn on when the electronic door lock is unlocked by a key. Responsive to the electronic door lock being unlocked by a key, the electronic door lock may send an unlocked by key message to the IoT platform. Processing logic may determine that the unlocked by key message causes the criteria of the rule to be satisfied. Processing logic may then generate a turn on light command and second that command to the light. The light may then turn on.

Figure 6:
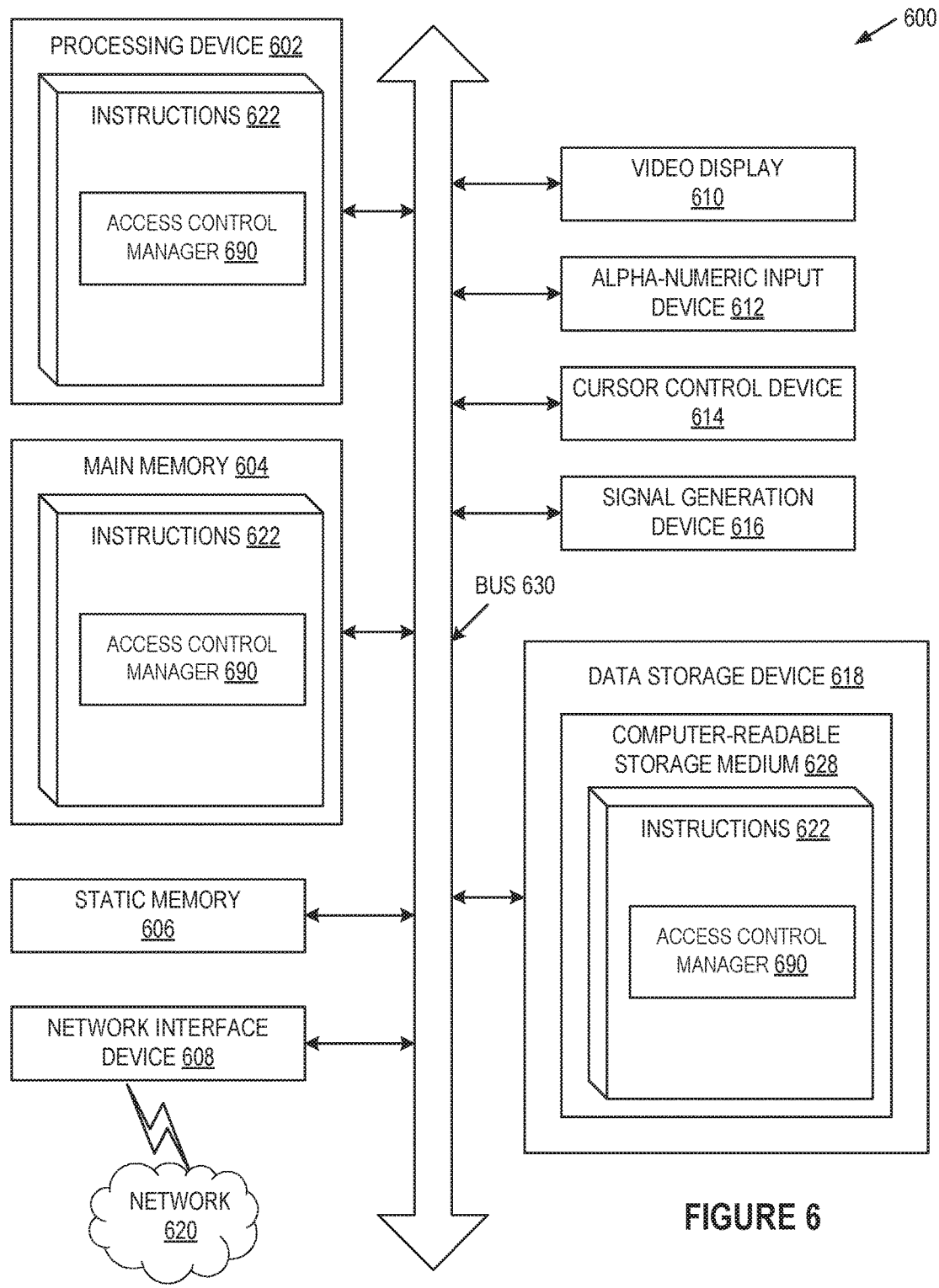
FIG. 6 illustrates a block diagram of one implementation of a computing device.

FIG. 6 illustrates a diagrammatic representation of a machine in the example form of a computing device 600 within which a set of instructions, for causing the machine to perform any one or more of the methodologies discussed herein, may be executed. In alternative implementations, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one implementation, computing device 600 corresponds to server computing device 125 of FIG. 1A.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium (or more specifically a computer-readable storage medium) 628 on which is stored one or more sets of instructions 622 embodying any one or more of the methodologies or functions described herein. The instructions 622 may also reside, completely or at least partially, within the main memory 604 and/or within the processing device 602 during execution thereof by the computing device 600, the main memory 604 and the processing device 602 also constituting computer-readable storage media.

The computer-readable storage medium 628 may also be used to store an access control manager 690 (e.g., as described with reference to FIG. 2A), and/or a software library containing methods that call an access control manager 690. While the computer-readable storage medium 628 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1A-2A) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "authenticating", "determining", "causing", "generating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Implementations of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other implementations will be apparent to those of skill in the art upon reading and understanding the above description. Although the present invention has been described with reference to specific example implementations, it will be recognized that the invention is not limited to the implementations described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    generating a first user account by a computing device of an internet-of-things (IoT) platform;
    generating a second user account by the computing device of the IoT platform;
    generating, by the computing device of the IoT platform, a link between the first user account and the second user account;
    logging an application or service of a client device into the IoT platform using the first user account;
    receiving, from the application or service of the client device logged into the first user account, a request to modify a state of an IoT device associated with the second user account, wherein the IoT device comprises a remotely accessible embedded system, and wherein the request is associated with the first user account, and wherein the first user account is not associated with the IoT device;
    determining, based on the link, that the application or service has access to the IoT device; and
    causing, by the computing device, the state of the IoT device associated with the second user account to be modified in accordance with the request received at the first user account.

2. The method of claim 1, further comprising:
    generating a third user account, wherein the second user account is associated with a first original equipment manufacturer (OEM) and the third user account is associated with a second OEM;
    generating an additional link between the first user account and the third user account;
    receiving an additional request to modify a state of an additional IoT device associated with the third user account;
    determining, based on the additional link, that the application has access to the additional IoT device; and
    causing the state of the additional IoT device to be modified in accordance with the additional request.

3. The method of claim 2, further comprising:
    reporting usage data associated with the IoT device to the first OEM; and
    reporting usage data associated with the additional IoT device to the second OEM.

4. The method of claim 2, further comprising:
    generating a rule associated with the IoT device and the additional IoT device;
    receiving data from the IoT device associated with the second user account;
    determining that the data satisfies a criterion of the rule; and
    causing the state of the additional IoT device associated with the second user account to change.

5. The method of claim 2, wherein the first user account is a super-user account that has privileges to perform actions available to the second user account and to perform additional actions available to the third user account.

6. The method of claim 1, wherein:
    the service is a third party service;
    the first user account is generated responsive to determining that a user has generated a first third party user account with the third party service, the first user account mirroring the first third party user account; and
    the second user account is generated responsive to determining that the user has generated a second third party user account with the third party service, the second user account mirroring the second third party user account.

7. The method of claim 6, wherein:
    the first third party user account is associated with a first application usable to log into the third party service;
    the second third party user account is associated with a second application usable to log into the third party service; and
    the first user account and the second user account are peer user accounts, where the first user account has access to devices and data associated with the second user account and the second user account has access to devices and data associated with the first user account.

8. The method of claim 6, further comprising:
receiving, from the third party service, an initial request by a proxy that is interposed between the computing device and the third party service, wherein the initial request has a first format associated with the third party service;
translating, by the proxy, the initial request into the request, wherein the request has a second format associated with an IoT platform executing on the computing device; and
sending, by the proxy, the request to the computing device.

9. The method of claim 1, wherein the second user account comprises metadata, and wherein the metadata comprises at least one of a context tag associated with a customer relationship management system, a location tag, a user pattern tag, or a user rating tag.

10. The method of claim 1, wherein generating the link comprises:
receiving first credentials;
authenticating access to the first user account based on the first credentials;
receiving second credentials; and
authenticating access to the second user account based on the second credentials.

11. A non-transitory computer readable storage medium comprising instructions that, when executed by a computing device of an internet-of-things (IoT) platform, cause the computing device to perform operations comprising:
generating, by the computing device of the IoT platform, a link between a first user account that lacks access to an IoT device and a second user account that has access to the IoT device, wherein the IoT device comprises a remotely accessible embedded system;
logging an application or service of a client device into the IoT platform using the first user account;
receiving, from the application or service of the client device logged into the first user account, a request to modify a state of the IoT device, wherein the request is associated with the first user account, and wherein the first user account is not associated with the IoT device;
determining, based on the link, that the application or service has access to the IoT device; and
causing, by the computing device, the state of the IoT device associated with the second user account to be modified in accordance with the request received at the first user account.

12. The non-transitory computer readable storage medium of claim 11, the operations further comprising:
generating a third user account, wherein the second user account is associated with a first original equipment manufacturer (OEM) and the third user account is associated with a second OEM;
generating an additional link between the first user account and the third user account;
receiving an additional request to modify a state of an additional network-accessible device associated with the third user account;
determining, based on the additional link, that the application has access to an additional IoT device; and
causing the state of the additional IoT device to be modified in accordance with the additional request.

13. The non-transitory computer readable storage medium of claim 12, the operations further comprising:
reporting usage data associated with the IoT device to the first OEM; and
reporting usage data associated with the additional IoT device to the second OEM.

14. The non-transitory computer readable storage medium of claim 12, the operations further comprising:
generating a rule associated with the IoT device and the additional IoT device;
receiving data from the IoT device associated with the second user account;
determining that the data satisfies a criterion of the rule; and causing the state of the additional IoT device associated with the second user account to change.

15. The non-transitory computer readable storage medium of claim 12, wherein the first user account is a super-user account that has privileges to perform actions available to the second user account and to perform additional actions available to the third user account.

16. The non-transitory computer readable storage medium of claim 11, wherein:
the first user account is generated responsive to determining that a user has generated a first third party user account with a third party service, the first user account mirroring the first third party user account; and
the second user account is generated responsive to determining that the user has generated a second third party user account with the third party service, the second user account mirroring the second third party user account.

17. The non-transitory computer readable storage medium of claim 16, wherein:
the first third party user account is associated with a first application usable to log into the third party service;
the second third party user account is associated with a second application usable to log into the third party service; and
the first user account and the second user account are peer user accounts, where the first user account has access to devices and data associated with the second user account and the second user account has access to devices and data associated with the first user account.

18. The non-transitory computer readable storage medium of claim 11, wherein the second user account comprises metadata, and wherein the metadata comprises at least one of a context tag associated with a customer relationship management system, a location tag, a user pattern tag, or a user rating tag.

19. The non-transitory computer readable storage medium of claim 11, wherein generating the link comprises:
receiving first credentials;
authenticating access to the first user account based on the first credentials; receiving second credentials; and
authenticating access to the second user account based on the second credentials.

20. A computing device comprising:
a memory; and
a processing device operatively coupled to the memory, the processing device to:
generate a first user account for a user with a component of an internet-of-things (IoT) platform;
generate a second user account for the user with the IoT platform;
generate a link between the first user account and a second user account;
log an application or service of a client device into the IoT platform using the first user account;

receive, from the application or service of the client device logged into the first user account, a request to modify a state of an IoT device associated with the second user account, wherein the IoT device comprises a remotely accessible embedded system, and wherein the request is associated with the first user account, and wherein the first user account is not associated with the IoT device;

determine, based on the link, that the application or service has access to the IoT device associated with the second user account;

generate a command to change the state of the IoT device associated with the second user account in accordance with the request received at the first user account; and send the command to the IoT device associated with the second user account.

\* \* \* \* \*